US011672335B2

(12) United States Patent
Zavala et al.

(10) Patent No.: US 11,672,335 B2
(45) Date of Patent: Jun. 13, 2023

(54) MOBILE ELECTRONIC DEVICE STAND

(71) Applicants: Sergio Zavala, Montebello, CA (US); Jordan Zachary Zavala, Montebello, CA (US)

(72) Inventors: Sergio Zavala, Montebello, CA (US); Jordan Zachary Zavala, Montebello, CA (US)

(73) Assignee: Z West Essentials LLC, Montebello, CA (US)

(*) Notice: Subject to any disclaimer, the term of this patent is extended or adjusted under 35 U.S.C. 154(b) by 159 days.

(21) Appl. No.: 16/948,010

(22) Filed: Aug. 27, 2020

(65) Prior Publication Data
US 2021/0059403 A1 Mar. 4, 2021

Related U.S. Application Data

(60) Provisional application No. 62/922,763, filed on Aug. 27, 2019.

(51) Int. Cl.
A47B 23/06 (2006.01)
H02J 7/00 (2006.01)
H02J 7/35 (2006.01)
H04R 1/34 (2006.01)
A47B 23/04 (2006.01)

(52) U.S. Cl.
CPC ............ A47B 23/06 (2013.01); A47B 23/043 (2013.01); H02J 7/0045 (2013.01); H02J 7/35 (2013.01); H04R 1/345 (2013.01)

(58) Field of Classification Search
None
See application file for complete search history.

(56) References Cited

U.S. PATENT DOCUMENTS

| | | | | |
|---|---|---|---|---|
| 1,169,869 A | * | 2/1916 | Richards | A47B 23/042 43/115 |
| 1,923,351 A | * | 8/1933 | Woodley | A47B 23/043 248/456 |
| 2,165,255 A | * | 7/1939 | Hamilton | A47B 23/043 248/455 |
| 3,599,925 A | * | 8/1971 | Dubler | A47B 97/04 248/452 |
| 6,243,473 B1 | * | 6/2001 | Azima | H04R 9/066 381/152 |

(Continued)

Primary Examiner — Steven M Marsh
(74) Attorney, Agent, or Firm — Squire Patent Consulting & IP Law LLC; Brendan E. Squire

(57) ABSTRACT

A stand for a mobile electronic device provides a font stand support surface and a rear stand support surface. Conveniently, the stand is configured to carry each of a mobile electronic device and a battery recharge pack. The front stand support surface and the rear stand support surface are formed in an inverted V shape orientation angled at an inclined plane and joined at an apex along a common edge between the two support surfaces. The inclined plane is angled at an angle to allow the user to view a display screen of the mobile electronic device. A passive acoustic enhancement panel is disposed along a side edge at an end of the stand. The passive acoustic enhancement panel is oriented to reflect an audio signal emitted from the mobile electronic device forwardly of the stand where the enhance acoustic signals may be heard by the user.

13 Claims, 3 Drawing Sheets

(56) References Cited

U.S. PATENT DOCUMENTS

| | | | |
|---|---|---|---|
| 6,557,811 B1 * | 5/2003 | Burns | A47B 23/044 |
| | | | 248/455 |
| 6,760,456 B1 * | 7/2004 | Annaratone | G06F 1/1688 |
| | | | 361/679.55 |
| 7,778,431 B2 | 8/2010 | Feng et al. | |
| 8,086,285 B2 | 12/2011 | McNamara et al. | |
| 8,412,289 B1 | 4/2013 | Oh | |
| 8,528,690 B1 | 9/2013 | Wu | |
| 8,731,219 B2 | 5/2014 | Weiss | |
| 9,172,781 B1 | 10/2015 | Goldstein | |
| 9,198,305 B2 | 11/2015 | Smith | |
| 9,226,057 B1 * | 12/2015 | Davis | H04R 7/045 |
| 9,232,030 B2 | 1/2016 | Freshman et al. | |
| 9,258,397 B2 | 2/2016 | Lee et al. | |
| 9,318,089 B2 | 4/2016 | Chang | |
| 9,510,072 B2 | 11/2016 | Newman | |
| 9,677,704 B1 * | 6/2017 | Thelen | F16M 11/22 |
| 9,829,919 B2 | 11/2017 | Flueckiger et al. | |
| 10,015,572 B2 | 7/2018 | Fontana | |
| 10,051,361 B2 | 8/2018 | Morin | |
| 10,114,416 B1 | 10/2018 | DPenha et al. | |
| 10,122,194 B2 | 11/2018 | Fluckiger et al. | |
| 10,321,223 B2 | 6/2019 | DPenha et al. | |
| 10,348,351 B2 | 7/2019 | Rivera | |
| 2009/0169040 A1 | 7/2009 | Chen et al. | |
| 2013/0083953 A1 * | 4/2013 | Chang | G06F 1/1628 |
| | | | 361/679.01 |
| 2015/0335115 A1 * | 11/2015 | Kim | A45C 11/00 |
| | | | 224/191 |

* cited by examiner

MOBILE ELECTRONIC DEVICE STAND

CROSS-REFERENCE TO RELATED APPLICATION

This application claims the benefit of priority of U.S. provisional application No. 62/922,763 filed Aug. 27, 2019, the contents of which are herein incorporated by reference.

BACKGROUND OF THE INVENTION

The present invention relates to stands for mobile electronic device, and more particularly to stands with passive acoustic enhancement for an audio signal produced by the mobile electronic device.

Many mobile electronic devices, such as cellular telephones, include one or more internal speakers to allow a user of the device to listen to an audio playback on the device. The internal speakers have a limited audio output capacity.

Accordingly, means have been developed to amplify or enhance the audio output of the mobile electronic device. Typically, these will be active acoustic enhancement systems, incorporating an electronic amplifier circuit and a speaker. These active systems may also include equalizers, and the like, to enhance the audio system played on the speaker. The mobile electronic device is connected to these systems via a dock having an electronic connection between the mobile electronic device and the electronic amplifier circuit. These systems may include an internal battery source for power, or may include a power adapter for connection to an electrical power source, such as a wall outlet or a vehicle electrical system.

Other systems employ a passive acoustic enhancement incorporated in the stand that include various wave guide chambers to reflect the sound wave output of the internal speakers to develop a more robust audio signal from the output of the speakers. The wave guide chambers can be convoluted structures, which can increase the costs of manufacture for even a simple stand.

While many of these devices provide suitable listening to the audio output of the mobile electronic device, they do not support the device at an angle suitable for viewing a display of the portable electronic device.

As can be seen, there is a need for an improved stand for a mobile electronic device that provides a simplified construction for passive enhancement of the audio output of the mobile electronic device.

SUMMARY OF THE INVENTION

In one aspect of the present invention, a stand for a mobile electronic device is disclosed. The stand includes a front support surface and a rear support surface oriented in an inverted V shape with the respective surfaces angled at an inclined plane and joined along a common edge along an apex of the inverted V shape. The front support surface dimensioned to support a back surface of the mobile electronic device. An acoustic enhancement panel is joined along a side edge of the front support surface. The acoustic enhancement panel is angled forwardly of the front support surface and oriented to reflect an audio signal emitted by a speaker of the mobile electronic device forwardly of the stand.

In some embodiments, a front ledge extends along a lower end of the front support surface. A lip may protrude upwardly from the front ledge. A rear ledge may also extend along a lower end of the rear support surface. A lip may protrude upwardly from the rear ledge.

In some embodiments, the front support surface and the rear support surface are movably joined along the apex. The angle of the front support surface and the rear support surface is adjustable between 5 degrees and 95 degrees.

In some embodiments, the acoustic enhancement panel is adjustably joined along the side edge of the front support surface. The acoustic enhancement panel may be adjustable between 5 degrees and 95 degrees.

In some embodiments, a charging aperture disposed through the acoustic enhancement panel, the charging aperture dimensioned to receive a charging connector of an electrical charging device. A battery pack may be carried on the rear support surface. A solar cell may be integrated with the battery pack to charge the battery pack. A charging cable may extend from the battery pack and through the charging aperture. The mobile electronic device may be carried on the front support surface. The charging cable is then connected to a charging port of the mobile electronic device.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provides a stand for a mobile electronic device, such as a cell phone. The stand supports the mobile electronic device at an incline viewing angle so that a user may view a display of the mobile electronic device. The stand may also provide passive enhancement for audio signal produced by the mobile electronic device. The stand may also include a holder for a battery recharging system for the mobile electronic device. The battery recharging system may include a solar charging cell. The battery recharging system may also include a battery pack. The solar charging cell may include an integrated battery pack.

Figure 1:
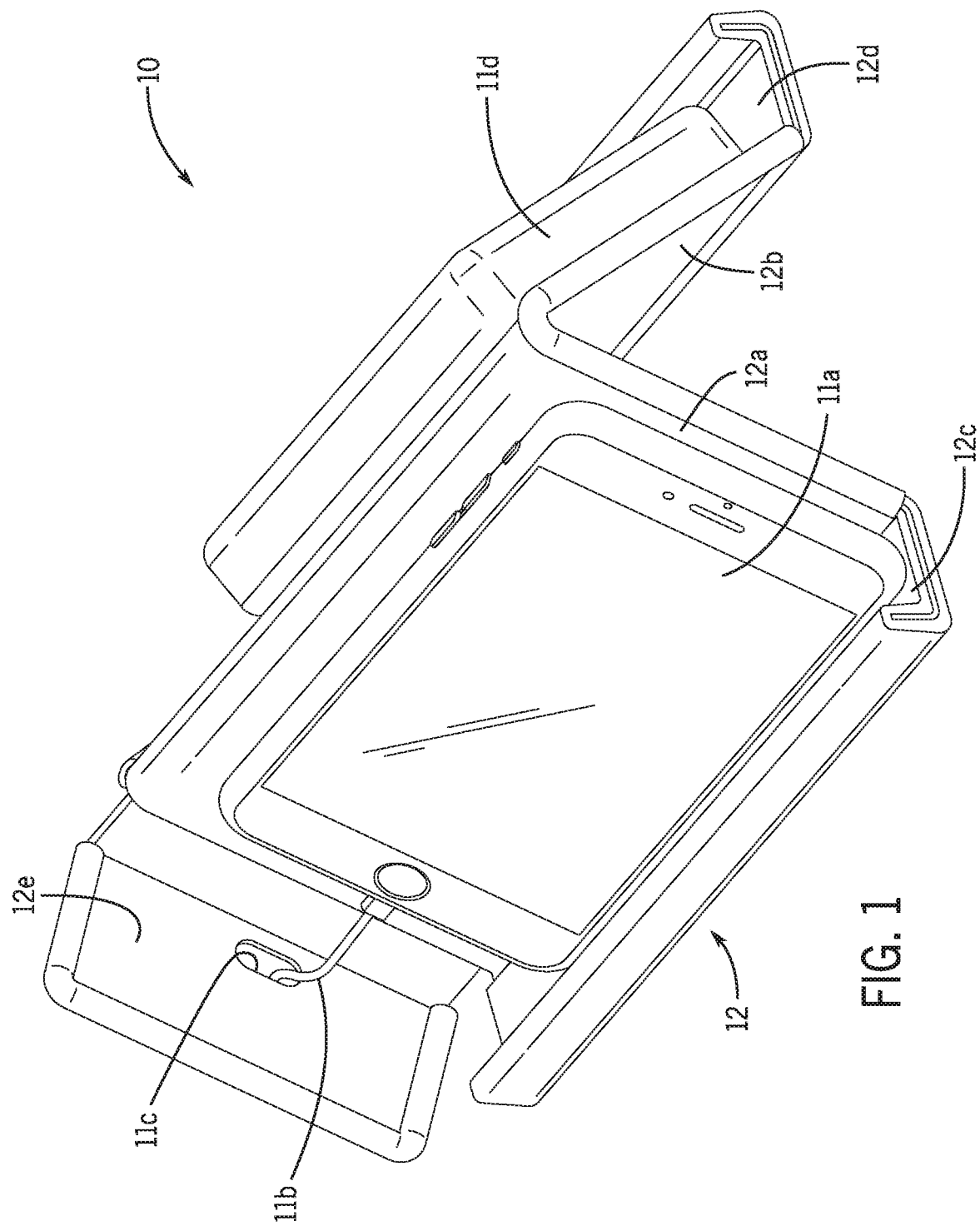
FIG. 1 is a front perspective view of the invention in use.
Figure 2:
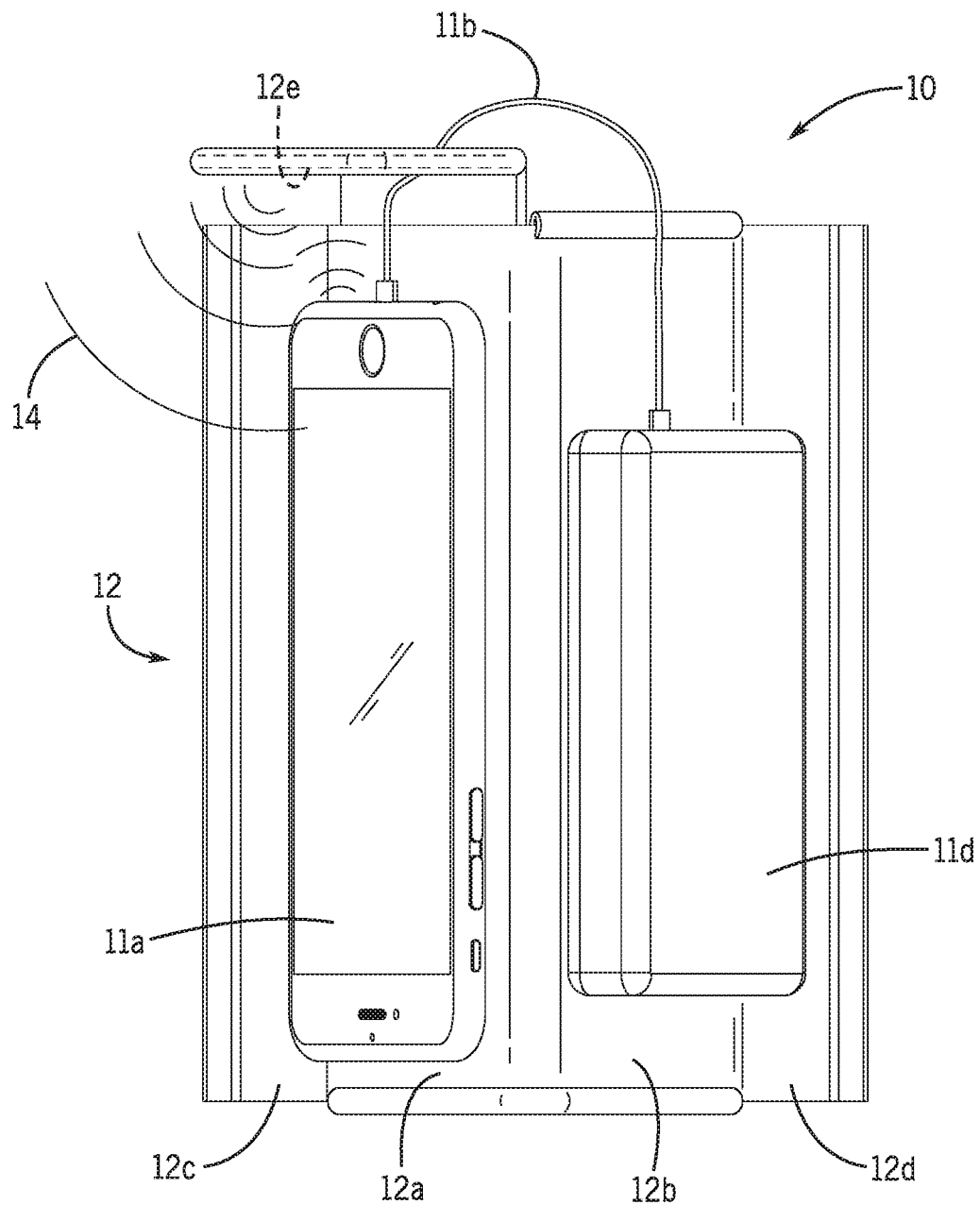
FIG. 2 is a top plan view of the invention in use.
Figure 3:
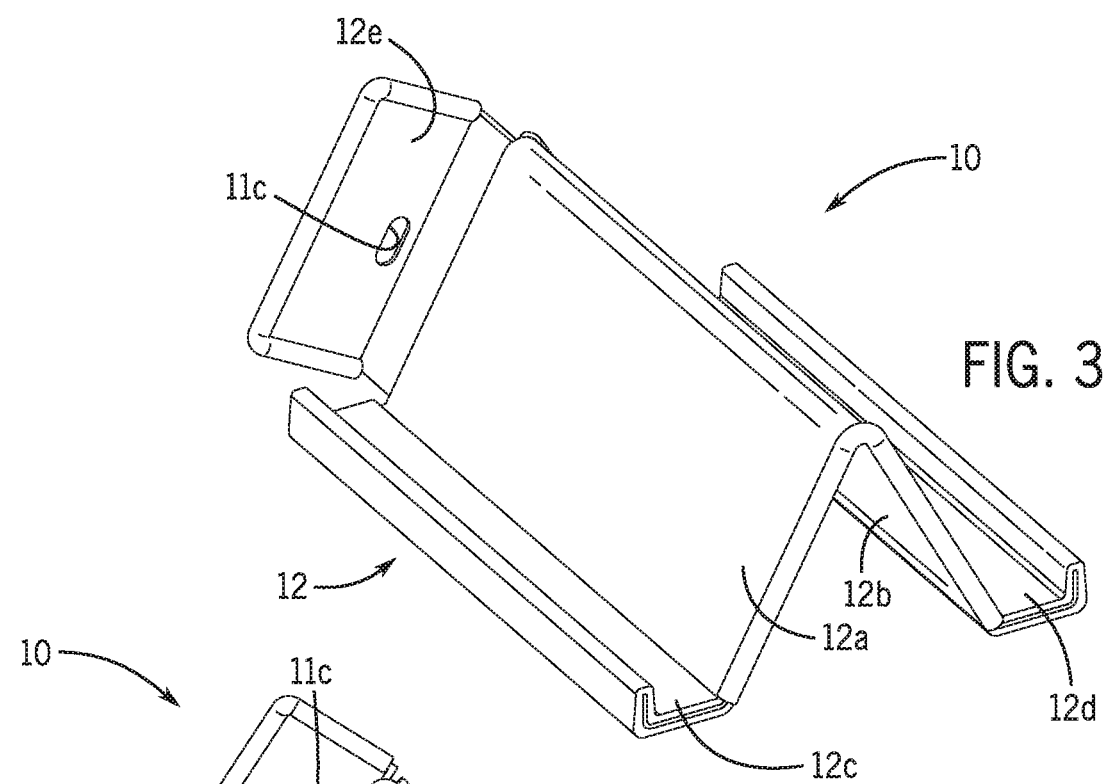
FIG. 3 is a front perspective view of the invention.
Figure 4:
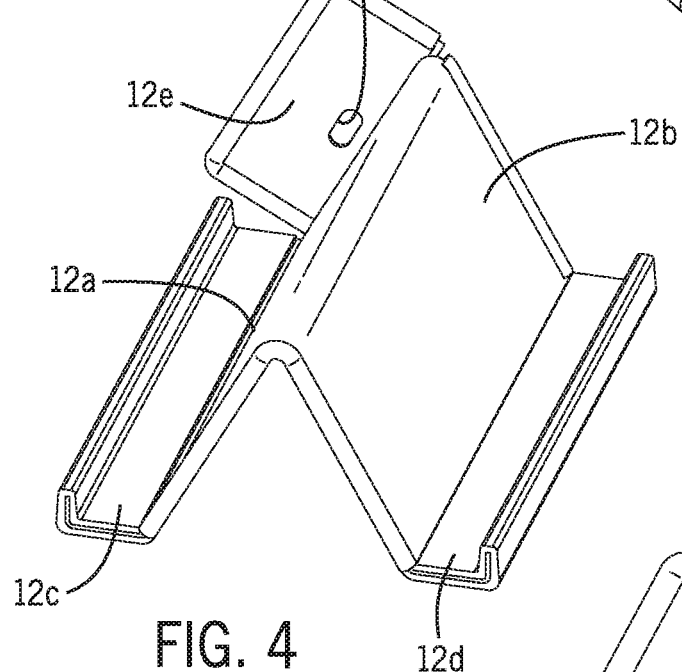
FIG. 4 is a top perspective view of the invention.
Figure 5:
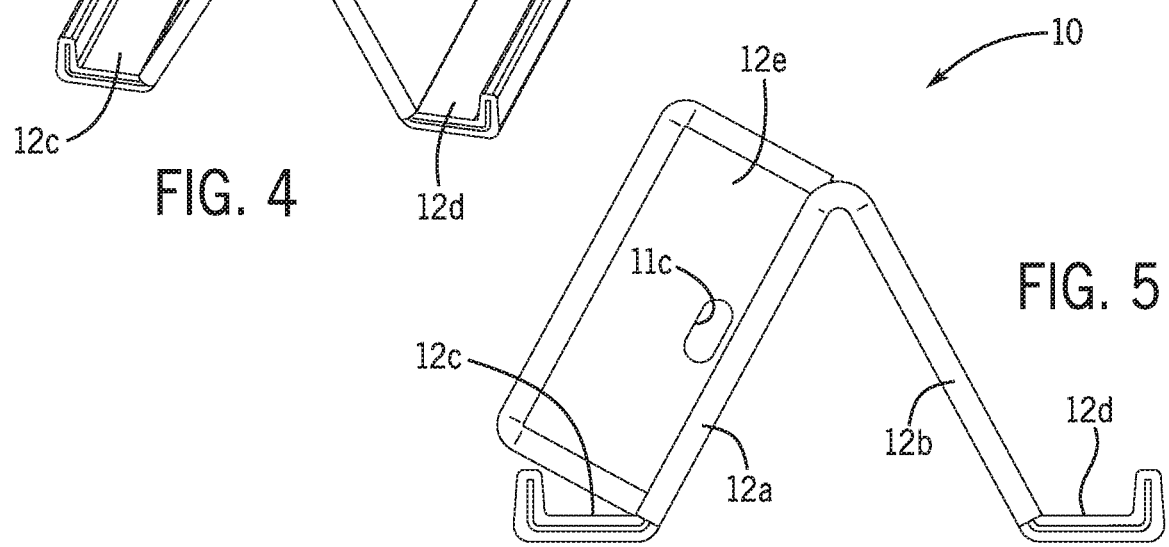
FIG. 5 is a front elevation view of the invention.

As seen in reference to the drawings of FIGS. 1-5, a stand 10 for a mobile electronic device 11a. The stand 10 provides a font stand support surface 12a and a rear stand support surface 12b. Conveniently, the stand is configured to carry each of a mobile electronic device 11a, a battery recharge pack 11d, which supported by a front support ledge 12c and a rear support ledge 12d protruding from a lower edge surface of each of the front and rear support surfaces 12a, 12d. Each of the front support ledge 12c and the rear support ledge 12d may have a lip extending upwardly from the ledge to retain the mobile electronic device 11a and the battery recharge pack 11d on the stand 10. When the mobile electronic device 11a is carried in a vertical orientation in the front support ledge 12c and lip may serve as a passive acoustic device.

The front stand support surface 12c and the rear stand support surface 12d are formed in an inverted V shape orientation with the respective surfaces angled at an inclined plane and joined at an apex along a common edge between the two support surfaces 12a, 12b. The inclined plane is angled at an angle to allow the user to view a display screen of the mobile electronic device 11a. A hinge or moveable connection along the apex may be provided to allow the inclined angle to be adjustable from 5° to 95°.

A passive acoustic enhancement panel 12e is disposed along a side edge at an end of the stand 10. The passive acoustic enhancement panel 12e is angled forwardly of the front support surface 12a. The passive acoustic enhancement panel 12e is oriented to reflect an audio signal 14 emitted from the mobile electronic device 11a forwardly of the stand 10, where the enhance acoustic signals may be heard by the user. The passive acoustic enhancement panel 12e is formed as substantially flat plate. The passive acoustic enhancement panel 12e has a depth of at least a thickness of the mobile electronic device 11a. The passive acoustic enhancement panel 12e may have a width at least as wide as an external speaker of the mobile electronic device 11a. More preferably, the passive acoustic enhancement panel 12e is at least that of the mobile electronic device 10.

In some embodiments, the passive acoustic enhancement panel 12e may also have a charging aperture 11c defined through a face of the panel 12e. The aperture is dimensioned to receive a charging connector a charging cord 11b. The charging cord 11b has a length to extend between a charging port connector of the mobile electronic device 11a, carried on the front support surface 12a of the stand 10 and a battery recharge device 11d carried on the rear support surface 12b of the stand 10.

The passive acoustic enhancement panel 12e can be adjustably attached to the front support surface 12, such as by using a hinge, an axis, a joint, a pin, or a ball and socket, to allow the passive acoustic enhancement panel 12e to be adjusted from 5° to 95° for acoustic adjustments and be able to hear the sound echo in a full range of sound.

It should be understood, of course, that the foregoing relates to exemplary embodiments of the invention and that modifications may be made without departing from the spirit and scope of the invention as set forth in the following claims.

What is claimed is:

1. A stand for a mobile electronic device, comprising:
   a front support surface and a rear support surface oriented in an inverted V shape with the respective surfaces angled at an inclined plane and joined along a common edge along an apex of the inverted V shape, the front support surface dimensioned to support a back surface of the mobile electronic device;
   an acoustic enhancement panel joined along a side edge of the front support surface, the acoustic enhancement panel angled forwardly of the front support surface and oriented to reflect an audio signal emitted by a speaker of the mobile electronic device forwardly of the stand; and
   a charging aperture disposed through the acoustic enhancement panel, the charging aperture dimensioned to receive a charging connector of an electrical charging device.

2. The stand of claim 1, further comprising:
   a front ledge extending along a lower end of the front support surface.

3. The stand of claim 2, further comprising:
   a lip protruding upwardly from the front ledge.

4. The stand of claim 1, further comprising:
   a rear ledge extending along a lower end of the rear support surface.

5. The stand of claim 4, further comprising:
   a lip protruding upwardly from the rear ledge.

6. The stand of claim 1, wherein the front support surface and the rear support surface are movably joined along the apex; and
   the angle of the front support surface and the rear support surface is adjustable between 5 degrees and 95 degrees.

7. The stand of claim 1, wherein the acoustic enhancement panel is adjustably joined along the side edge of the front support surface.

8. The stand of claim 7, wherein the acoustic enhancement panel is adjustable between 5 degrees and 95 degrees.

9. The stand of claim 1, further comprising:
   a battery pack carried on the rear support surface.

10. The stand of claim 9, further comprising:
    a solar cell integrated with the battery pack to charge the battery pack.

11. The stand of claim 9, further comprising:
    a charging cable extending from the battery pack and through the charging aperture.

12. The stand of claim 11, further comprising:
    the mobile electronic device carried on the front support surface.

13. The stand of claim 12, wherein the charging cable is connected to a charging port of the mobile electronic device.

* * * * *